Aug. 12, 1969         A. G. BODINE, JR         3,460,486
LOCOMOTIVE TRACTION INCREASED BY SONIC VIBRATIONS
Filed April 18, 1966                      6 Sheets-Sheet 1

FIG. 1

INVENTOR
ALBERT G. BODINE JR.
BY
Edward A. Sokolski
ATTORNEY

United States Patent Office

3,460,486
Patented Aug. 12, 1969

3,460,486
LOCOMOTIVE TRACTION INCREASED
BY SONIC VIBRATIONS
Albert G. Bodine, Jr., 7877 Woodley Ave.,
Van Nuys, Calif. 91406
Filed Apr. 18, 1966, Ser. No. 543,258
Int. Cl. B61c 11/00, 15/00; B60b 17/00
U.S. Cl. 105—73                          19 Claims

ABSTRACT OF THE DISCLOSURE

High level sonic energy is generated by means of an orbiting mass oscillator and such energy is coupled to the wheels of a vehicle, such as a railroad locomotive. An orbiting mass oscillator is positioned and operated to provide optimum high sonic action at the interface between the wheels and the rails on which such wheels ride, thus cleaning contaminants from the rails and attaining intimate metal-to-metal contact at such interface. In a preferred embodiment of the device of the invention, the rotation speed of the orbiting mass oscillator is adjusted to produce resonant vibration of a vibration system, including the engine wheels, thereby achieving extremely high level of sonic action.

---

This invention relates to a sonic method and apparatus for achieving improved traction in wheeled vehicles, and more particularly to such a method and apparatus utilizing sonic energy to achieve more intimate contact between the wheels of a vehicle and the surfaces on which it rides.

In a wheeled vehicle such as a railroad engine, difficulties are often encountered in achieving the desired frictional contact between the rail and the wheels of the engine. Such impaired frictional contact is generally due to foreign matter such as dirt, liquid films, and oxide coatings which build up on the rails. Such rail contamination is especially troublesome in the vicinity of large cities where air pollutants and dust are highly prevalent. Such rail contamination not only greatly impairs the efficiency of the operation of a railroad engine, particularly in starting and braking, but places severe limitations on the loads that can be carried and the rate at which loads can be accelerated.

Efforts have been made to alleviate this problem involving the utilization of sand tanks which dump a stream of sand on the rails ahead of the wheels, attempting to cause the grit to work through the film and form an effective frictional mechanical key between the wheel and the rail. This technique is undesirable because it not only works down into the rail ballast and causes the gravel around the rail ties to give trouble, but in addition the sand is a maintenance hazard in that it flows up into the working mechanism of the train causing increased wear of moving parts of the train, such as bearings and gears.

The device of this invention eliminates all of the undesirable qualities of the sand tank techniques and provides superior frictional contact between the wheels and rails by applying sonic energy at the interface therebetween. By the term "interface" I mean to imply the accepted definition concerning actual area of mutual contact, sometimes also referred to in terms of elastically deformed footprint. This is a relatively small area, with a steel wheel on a steel rail. The sonic energy applied by the method and apparatus of this invention effectively removes the film material by a kind of sonic cleaning action and thus attains intimate metal to metal contact at the wheel-rail interface. It has been found that not only does the high level sonic energy disperse the contaminants, but also causes the metal members to rub closely together to achieve better frictional contact than heretofore possible even in the absence of rail contamination.

High-level sonic energy simply means, of course, that the particular sonic energy here to be of high power level, such as in terms of sonic horsepower. This high sonic power level is thus not to be confused with incidental noise and vibration such as that normally occurring in the operation of trains. With high sonic energy level it is possible to deliver large cyclic force at the interface, otherwise normally called high impedance force, as mentioned hereinafter. Also the high sonic energy can appear at the interface as a high sonic action or motion, which is sometimes called low impedance conditions, as referred to hereinafter. All forms, either high impedance (large vibratory force) or low impedance (large vibratory action or motion) require high sonic energy.

In achieving the desired end results, a preferred form of the method and apparatus of this invention typically utilizes mechanical orbiting mass oscillators which in certain embodiments of the device of the invention are attached to the engine axle and in other embodiments of the device of the invention are attached to the engine wheels. The orbiting mass oscillators are positioned and operated to provide optimum high sonic action at the interface between the wheels and the rail members in response to the control of the engine operator, usually when accelerating the train. Conditions of acceleration, as well as deceleration, of course, occur when torque is being applied to the wheel. The orbiting mass oscillators utilized may be pneumatically driven by means of compressed air or steam from the locomotive's auxiliary power system.

Extremely high levels of sonic action can be achieved by adjusting the rotation speed of the orbiting mass oscillators to produce resonant vibration of a resonant vibrating system including the engine wheels. This resonance of the basic wheel system structures uniquely combats the high blocking reactances of the large massive wheels and axle which otherwise tend to prevent effective sonic action. By the expression "high blocking reactance" I mean the accepted definition which simply means high inertia. In other words, the inertia of the heavy wheels tends to resist any attempts at shaking them. Therefore, as discussed here, resonance is a desirable form of practicing my invention, because at resonance these massive inertias are effectively neutralized by the elasticity of the system. Very active sonic vibration, as described, can thus be accomplished at resonance whereby the problems of mass inertia are ameliorated. Along these lines it is to be noted that the orbiting mass oscillators utilized in the device of the invention tend to automatically lock in with the load so as to maintain resonant operation with changes in the parameters of the vibrating system.

It is therefore an object of this invention to provide means for improving the traction in a wheeled vehicle such as a railroad locomotive.

It is a further object of this invention to provide means for improving the acceleration and deceleration capabilities of railroads.

It is another object of this invention to enable the carrying of greater loads by railroad locomotives.

It is still a further object of this invention to provide sonic means for removing friction impairing contaminants from railroad rails.

It is still a further object of this invention to provide means for utilizing sonic energy at the interface between railroad wheels and the rails on which they ride to improve the frictional contact therebetween.

Other objects of this invention will become apparent from the following description taken in connection with the accompanying drawings of which.

The sonic vibrations utilized in this invention are to be distinguished from certain bodily shaking techniques of the prior art in that this invention involves cyclic elastic deformations which travel through a medium with a characteristic velocity of propagation. In other words, by the term sonic vibration I mean elastic vibration of structure. These elastic vibrations do not interfere with electrical transmissions such as for signals and the like. If these vibrations travel longitudinally or create a longitudinal wave pattern in a medium having a uniformly distributed modulus of elasticity and mass, we have sound wave transmission.

It is helpful to the comprehension of the invention to make an analogy between an electrical resonant circuit and a mechanical resonant circuit. This type of analogy is well known to those skilled in the art and is described, for example, in Chapter 2 of "Sonics" by Hueter and Bolt, published in 1955 by John Wiley and Sons. In making such an analogy, force, F, is equated with electrical voltage, E; velocity of vibration, $u$, is equated with electrical current, $i$; mechanical compliance, $C_m$, is equated with electrical capacitance, $C_e$; mass, M, is equated with electrical inductance, L; mechanical resistance (friction), $R_m$, is equated with electrical resistance, R; and mechanical impedance, $Z_m$, is equated with electrical impedance, $Z_e$. Thus, it can be shown that if a member is elastically vibrated by a sinusoidal force, $F_o \sin \omega t$, $\omega$ being equal to $2\pi$ times the frequency of vibration, that $$Z_m = R_m + j\left(\omega M - \frac{1}{\omega C_m}\right) = \frac{F_o \sin t}{u} \quad (1)$$

Where $\omega M$ is equal to $1/\omega C_m$, a resonant condition exists, and the effective mechanical impedance, $Z_m$, is equal to the mechanical resistance, $R_m$, the reactive impedance components, $\omega M$ and $1/\omega C_m$, cancelling each other out. This cancellation, as explained above, is the condition where the mass inertia ($\omega M$) is neutralized by the compliance ($\omega C_m$), when the system is operated at resonance. Under such a resonant condition, velocity of vibration, $u$, is at a maximum, effective power factor is unity, and energy is most effectively delivered to the object being vibrated. It is such a high efficiency resonant condition in the elastic system being driven that is preferably utilized in the methods and devices of this invention to achieve the desired end results.

It is to be noted by reference to Equation 1 that velocity of vibration, $u$, is highest where impedance, $Z_m$, is lowest, and vice versa. Therefore, a high impedance load will tend to vibrate at relatively low velocity, and vice versa. Thus, at an interface between high and low impedance elements, a high relative movement results by virtue of such impedance mismatch which, as in the equivalent electrical circuit, results in a high reflected wave. Such an impedance mismatch at the interface between the train wheels and the rails results in high sonic action at such interface to provide highly effective cleaning and bonding effects.

Just as the sharpness of resonance of an electrical circuit is defined as the Q thereof, and is indicative of the ratio of energy stored to the energy used in each cycle, so also the Q of the mechanical resonant circuit has the same significance and is equal to the ratio between $\omega M$ and $R_m$. Thus, high efficiency and considerable cyclic motion can be achieved by designing the mechanical resonant circuit for high Q.

In considering Equation 1, several factors are to be noted. First, this equation represents the total effective resistance, mass, and compliance in a vibrating system, and these parameters are generally distributed throughout the system rather than being lumped in any one component or portion thereof. Secondly, the vibrating system often includes surrounding components from which the system's essential vibrating parts cannot be isolated. Thus, it may be desirable to purposely add members exhibiting predominantly compliance $C_m$, or mass M, characteristics to balance out one or the other of these parameters to make for a resonant system.

It is also to be noted that an orbiting mass oscillator is utilized in the invention that automatically adjusts its output frequency to maintain resonance with changes in the characteristics of the load. Thus, in the face of changes in the effective mass and compliance presented by the load, the system automatically is maintained in optimum resonant operation by virtue of the "lock in" characteristics of applicant's unique orbiting mass oscillators. The vibrational output from such an orbiting mass oscillator is generated along a controlled predetermined coherent path to provide maximum output along a desired axis or axes. The orbiting mass oscillator automatically changes not only its frequency but its phase angle and therefore its power factor with changes in the impedance load to assure optimum efficiency of operation at all times.

Figure 1:
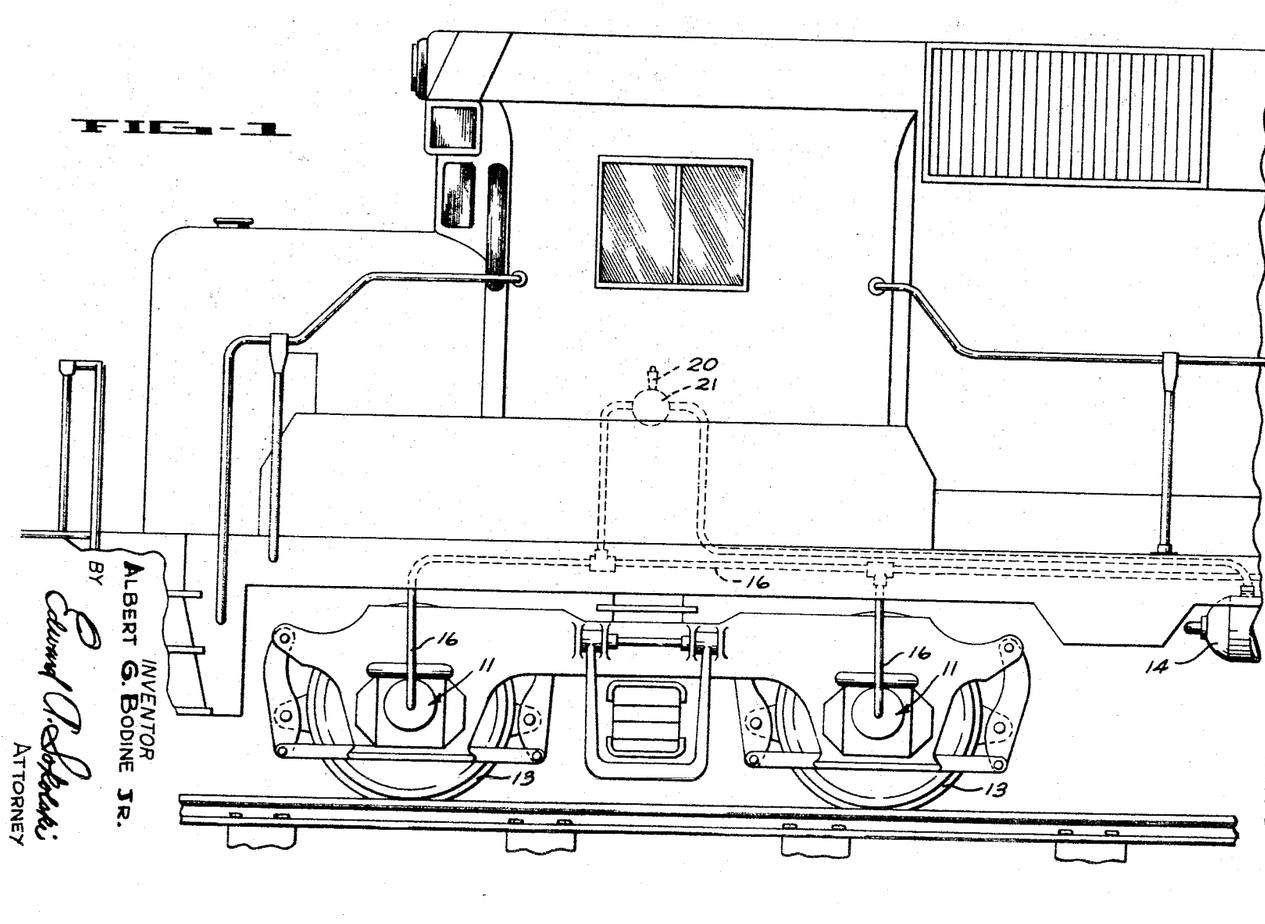
FIG. 1 is an elevational view illustrating the installation of one embodiment of the device of the invention on a railroad engine.

Referring now to FIG. 1, the installation of one embodiment of the device of the invention in a railroad engine is illustrated. Sonic excitation units 11 are mounted on the axles (not shown) of engine wheels 13. The excitation units include orbiting mass oscillators which are driven by compressed air or steam fed thereto from tank 14 through lines 16. The operation of sonic excitation units 11 is controlled by means of hand operated actuator 20, which in turn controls valve 21, which is interposed in line 16. Thus, the excitation of the fluid driven orbiting mass oscillators and the sonic excitation of the railroad axles is manually initiated when high traction is required as, for example, in starting and braking. As stated above, starting and braking is necessarily synonymous with torque at the wheels.

Figures 2, 3, 4:
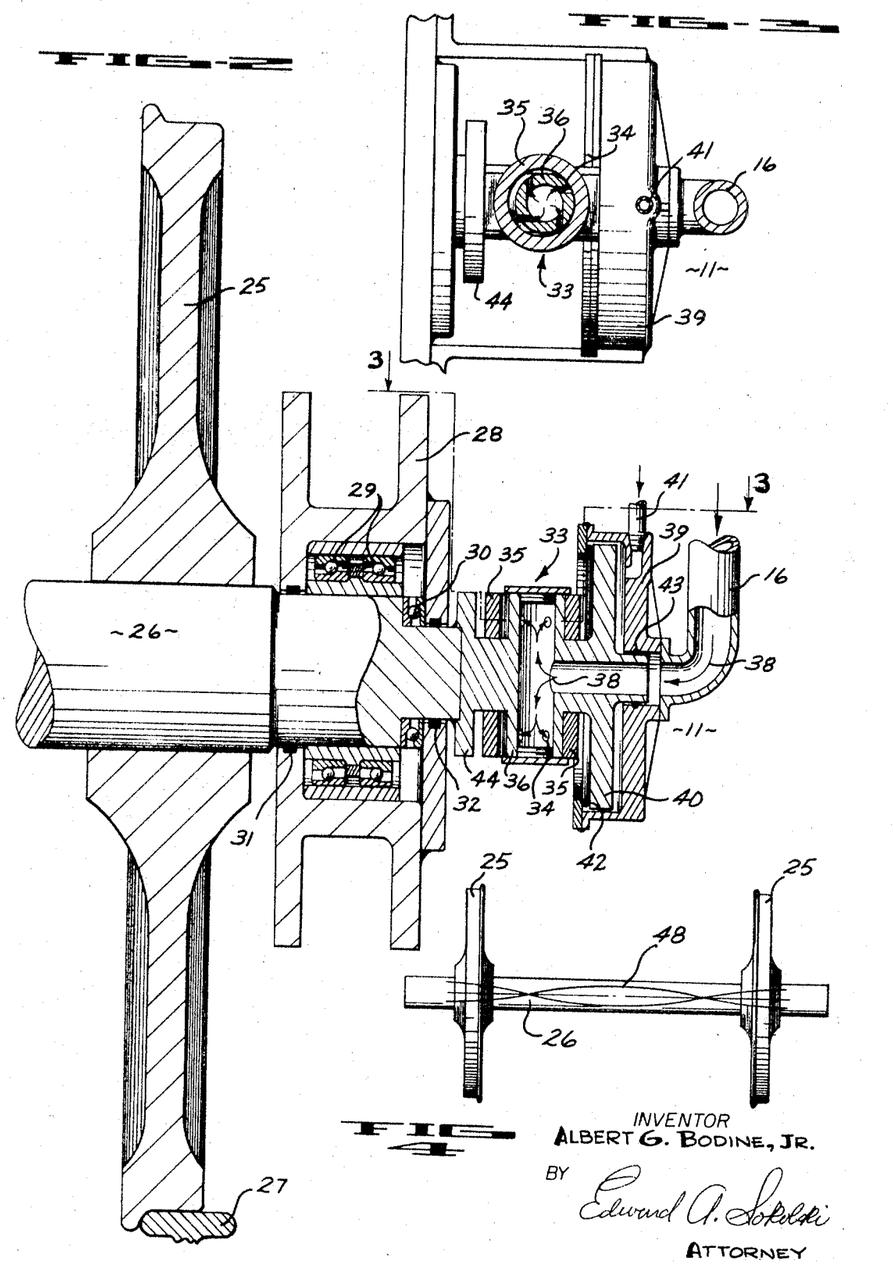
FIG. 2 is a cross sectional view in elevation illustrating a first embodiment of the device of the invention.
FIG. 3 is a view taken along the plane indicated by 3—3 in FIG. 2.
FIG. 4 is a schematic view illustrating how resonant vibrations may be set up in the embodiments of the invention utilizing the sonic excitation of a railroad axle.

Referring now to FIGS. 2 and 3, a first embodiment of the device of the invention is illustrated. Railroad wheel 25 is fixedly attached to axle 26. Axle 26 is mounted for rotation on the engine frame 28 by means of roller bearings 29 and 30. Roller bearings 29 and 30 are buried in oil which is contained within the area surrounding the bearings by means of seals 31 and 32.

Sonic excitation unit 11 is fixedly attached to the end of axle 26 by means of attachment plate 44 which is welded to the axle. Sonic excitation unit 11 includes an orbiting mass oscillator 33 comprising a pair of ring-shaped rotor members 35 which are supported for rotational and transverse movement on hollow post member 36. Rotor members 35 are rotationally driven about post 36 by means of the jet indicated by arrows 38, such jet arriving through line 16 from a suitable compressed air or steam source as described in connection with FIG. 1. The jet passes through tangential apertures 34 formed in post 36 and impinges against the inner rims of rotor members 35 to cause the rotation thereof. Line 16 is connected to housing 39, which in turn is supported on disc-shaped plate 40, with plate 40 having rotational freedom relative thereto. Plate 40 is integrally formed with post 36. Lubricating oil is fed into the spaces between housing 39 and plate 40 through line 41 and retained between the housing and the plate by means of O-rings 42 and 43 to provide lubricated bearing surfaces therebetween. The oscillator post member 36 which is integrally formed with attachment plate 44 and plate 40 has a small amount of freedom of motion along the longitudinal axis of axle 26, this being provided by virtue of axial clearance within housing 39. Such freedom of motion provides isolation to the vibrating system which facilitates the resonant vibration thereof.

Rotors 35 are preferably rotated at a speed such as to set up resonant longitudinal vibration of axle 26 as indicated in FIG. 4, with standing waves 48 being set up along the axle. Such sonic vibration causes the wheel to move laterally relative to the track at the sonic frequency in a generally sinusoidal pattern. This form of motion is especially effective in breaking through dirt film and in causing intimate metal to metal contact which is somewhat akin to sonic welding. Any tendency to weld is, of course, overcome by simultaneous application of torque or acceleration, as mentioned above. It follows, then, that in the practice of this invention the sonic energy must be high enough to appear as increased traction friction, when torque is being applied. With this type of axle excitation sufficient energy to achieve the desired end results can generally be obtained by utilizing a single sonic oscillator located at one end of the axle. The application of sonic energy to the axle itself is especially applicable where roller bearings are utilized for the rolling axle.

Orbiting mass oscillator 33 is the same type oscillator described in connection with FIGS. 5 and 6 of my copending application Ser. No. 426,101, filed Jan. 18, 1965, now Patent 3,354,688.

Figures 5, 6:
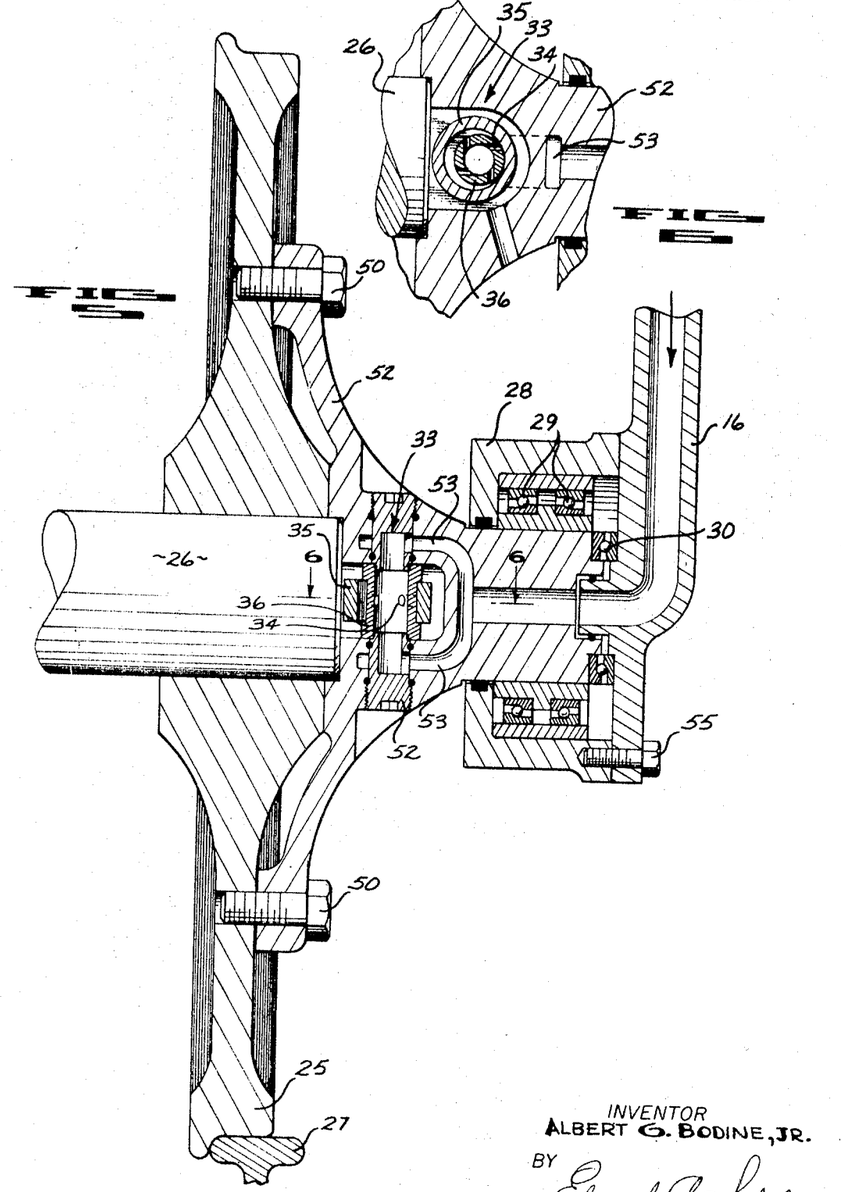
FIG. 5 is a cross sectional view in elevation illustrating a second embodiment of the device of the invention.
FIG. 6 is a cross sectional view taken along the plane indicated by 6—6 in FIG. 5.

Referring now to FIGS. 5 and 6, a second embodiment of the device of the invention in which sonic energy is applied to the axle of the railroad is shown. Attached to wheel 25 by means of bolts 50 is support member 52 which is rotatably connected to frame 28 by means of ball bearings 29 and 30. Wheel 25 is fixedly attached to axle 26. Oscillator unit 33 is supported within support member 52 with hollow post member 36 being threadably attached to such support member and a single rotor member 35 being contained for rotation about the post member. Rotor member 35 is rotatably driven about post member 36 by means of a jet of air or steam fed through lines 16 and 53 to the hollow center of post 36 and thence through apertures 34 against the inner rim of the rotor. Input line 16 is attached to frame 28 by means of bolt 55. The embodiment of FIGS. 5 and 6 operates in the same general fashion as that of FIGS. 2 and 3 to cause longitudinal resonant vibration of axle 26.

Figures 7, 8:
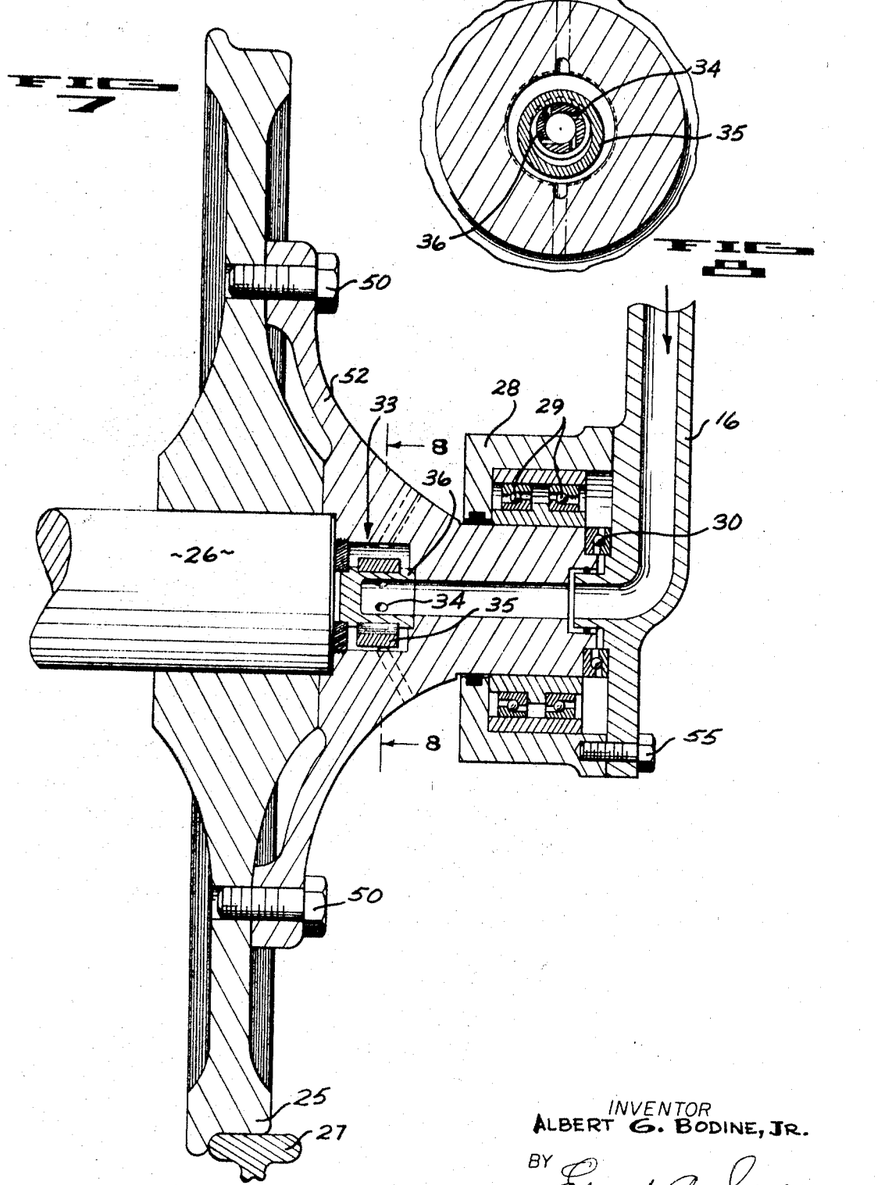
FIG. 7 is a cross sectional view in elevation of a third embodiment of the device of the invention.
FIG. 8 is a cross sectional view taken along the plane indicated by 8—8 in FIG. 7.

Referring now to FIGS. 7 and 8, a third embodiment of the device of the invention is illustrated. This embodiment is similar in its structural features to that of FIGS. 5 and 6 except for the fact that the oscillator unit 33 is mounted so as to generate a sonic vibrational pattern transverse to the longitudinal axis of axle 26. Rotor 35 is driven by the jet passing through apertures 34 formed in post 36 about an axis parallel to the longitudinal axis of the axle. This sets up vibrations in wheel 25 which cause a radial sonic impacting type vibrational motion relative thereto. This type of sonic action is particularly suitable in certain types of applications where lateral motion cannot penetrate through the contamination film.

Figures 9, 10:
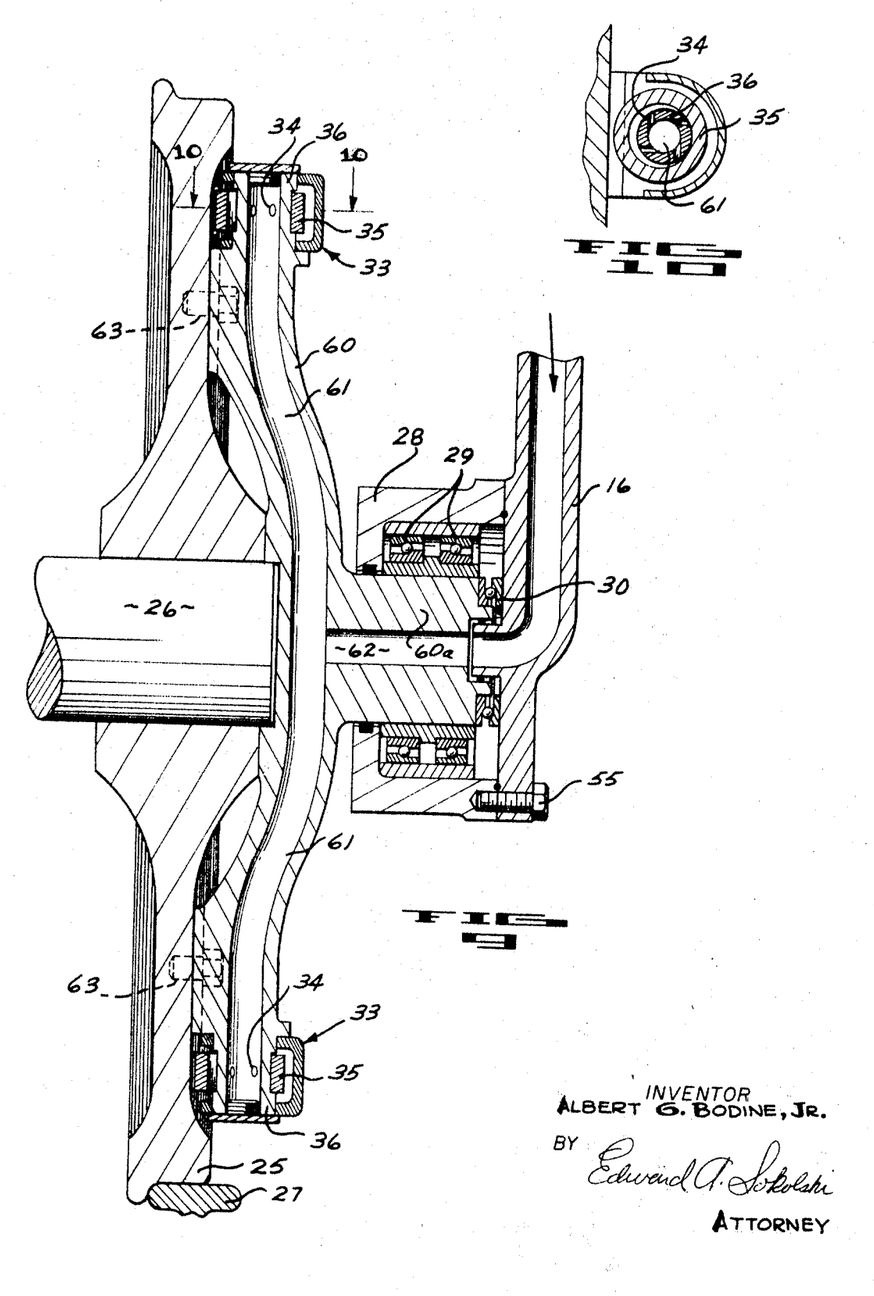
FIG. 9 is a cross sectional view in elevation of a fourth embodiment of the device of the invention.
FIG. 10 is a cross sectional view taken along the plane indicated by 10—10 in FIG. 9.
Figure 11:
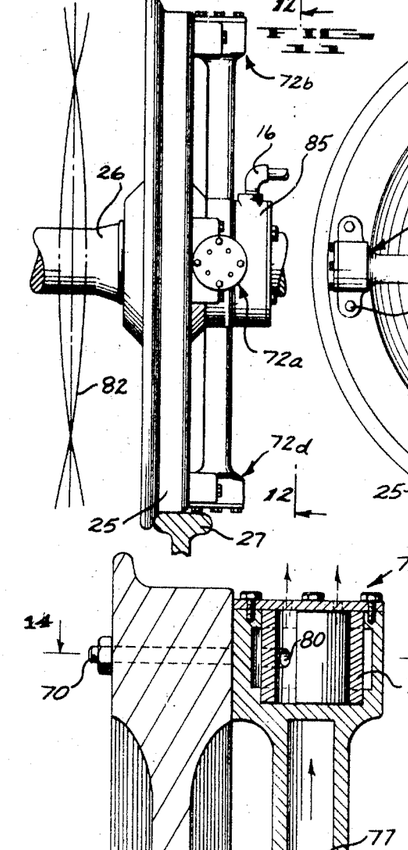
FIG. 11 is a side elevational view of a fifth embodiment of the device of the invention.
Figures 12, 14:
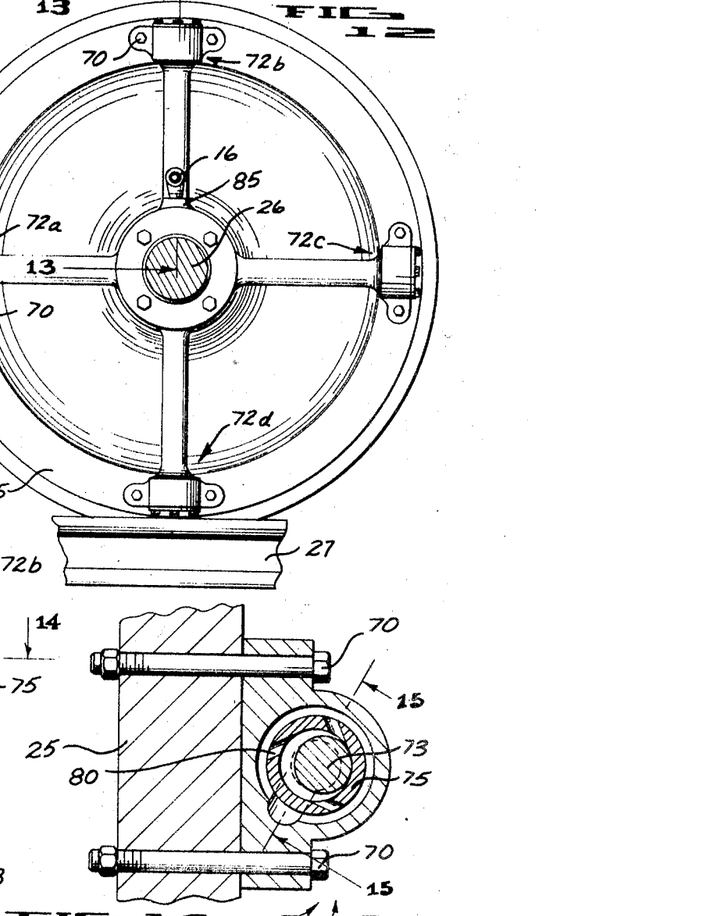
FIG. 12 is a view taken along the plane indicated by 12—12 in FIG. 11.
FIG. 14 is a cross sectional view taken along the plane indicated by 14—14 in FIG. 13.
Figure 13:
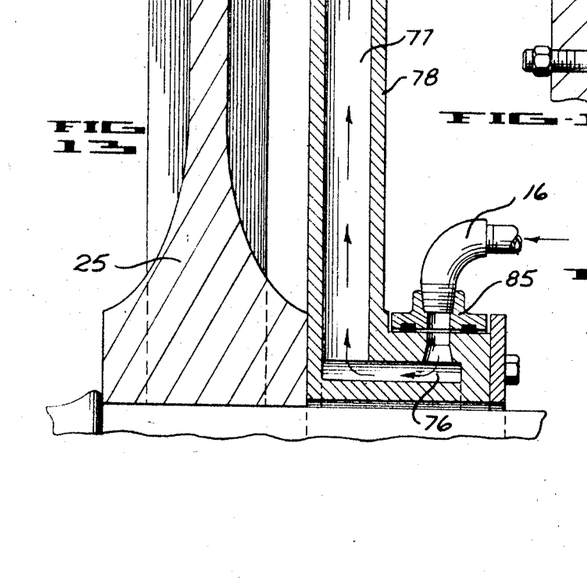
FIG. 13 is a cross sectional view taken along the plane indicated by 13—13 in FIG. 12.
Figure 15:
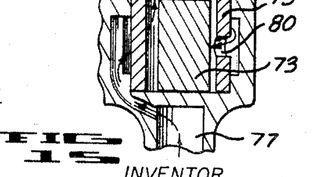
FIG. 15 is a cross sectional view taken along the plane indicated by 15—15 in FIG. 14.

Referring now to FIGS. 9 and 10, a fourth embodiment of the device of the invention is illustrated. In this embodiment, the sonic energy is applied to the rim of the wheel rather than the axle. The sonic energy is in this instance confined fairly well to the wheel itself, and therefore the type of bearings used on the main axle are of no concern to its operation. A pair of oppositely positioned oscillator units 33 are attached to the periphery of support plate 60, which is attached to wheel 25 by means of bolts 63. Support plate 60 has a cylindrical portion 60a which is rotatably connected to frame 28 by means of roller bearings 29 and 30. The input line 16 for the air or steam jet is attached to frame 28 by means of bolt 55 in the same manner as described in connection with FIGS. 5 and 7. Oscillator units 33 are of the same configuration as described in connection with the preceding embodiments, having cylindrical rotor members 35 which are mounted for rotation on a centrally located hollow post member 36. The propulsive jet of air or steam passes from input line 16 to channel 62 formed in cylindrical portion 60a and thence to channel 61 formed in plate 60. The jet passes from channel 61 through apertures 34 and tangentially impinges against the inner surfaces of rotors 35 to cause rotation thereof about post members 36.

The vibrational output of oscillators 33 is transferred to the rim of wheel 25 to cause sinusoidal lateral elastic vibration thereof. A lateral elastic pattern can be seen to run around the rim of the wheel so that the wheel goes into a flexural mode of vibration with the edge of the rim flexing. At the interface between wheel 25 and rail 27, a sinusoidal lateral slipping vibration of the wheel surface occurs similar to the motion generated in the previously described embodiment of the invention illustrated in FIGS. 2 and 3.

It is to be noted that oscillators 33 tend to phase and frequency lock with each other in such a way as to produce optimum transfer of vibrational energy to the wheel and to maintain a resonant condition where the vibrational system is initially set to operate at resonance.

Referring now to FIGS. 11–15, a fifth embodiment of the device of the invention is illustrated. In this embodiment, the wheel rim is excited by four oscillator units 72a–72d, operating in conjunction with each other to produce resonant vibration of the wheel. Oscillator units 33 are mounted on the rim of wheel 25 in quadrature relationship by means of bolts 70.

Oscillator units 72a–72d differ from the oscillators described in connection with the other embodiments in that the rotor members 73 thereof are in the form of centrally located solid cylinders which rotate around within raceways formed by the inner walls of hollow post members 75. The jet is fed from input line 16 through channel 76 formed in the wheel hub region and channels 77 formed in spoke members 78 to each of the oscillator units. The jet passes through apertures 80 formed in post members 75 to tangentially drive cylindrical rotors 73. The rotation speed of rotors 73 is preferably adjusted to cause resonant vibration of the wheel member so as to set up a standing wave pattern as indicated by graph line 82 in FIG. 11. With the oscillators located at the rim of the wheel, the standing wave pattern is such that a low impedance condition is presented at the interface between wheel 25 and rail 27. In view of the relatively high impedance presented by the rail, an impedance mismatch condition thus occurs at such interface which results in a high reflected wave. This results in high sonic action at the interface to more effectively produce the desired end results. The oscillators tend to lock in with each other to maintain the resonant vibrational condition, thus assuring optimum operation at all times.

Input line 16 is supported on a slip-ring member 85 to avoid windup thereof with wheel rotation.

It is to be noted that the invention is capable of being practiced by other modes of vibration than those indicated, as long as there is an elastic function in combination therewith. Along these lines, for example, a torsional mode can be generated in the axle, particularly one wherein the two wheels vibrate torsionally 180° out of phase with each other. Here the wave pattern and the axle would be made to have a node in the center with one wheel turning in one direction and the other wheel in an opposite direction with a reversal occurring on each cycle. This can be accomplished by appropriately phasing the oscillators of embodiments such as illustrated in FIGS. 9–15.

As indicated above, one major advantage of this invention is the accomplishment of elastic resonance within the wheel and axle structure, so as to make the heavy system acoustically transparent and thus capable of transmitting high sonic energy levels to the wheel-rail interface.

The device of this invention thus provides highly effective means for achieving high traction in a vehicle such as a railroad locomotive to enable more efficient starting and braking and the carrying of greater loads than heretofore feasible.

While the devices and methods of this invention have been described and illustrated in detail, it is to be clearly understood that this is intended by way of illustration and example only and is not to be taken by way of limitation, the spirit of this invention being limited only by the terms of the following claims.

I claim:

1. A method for improving the traction between the wheel of a vehicle and a rail on which such vehicle rides comprising
generating high level sonic elastic vibrational energy,
coupling said energy to the wheel of said vehicle to cause high sonic action at the interface between said wheel and said rail, and
maintaining driving torque on said wheel while said wheel is forced against said rail with high contact pressure, said sonic energy level being sufficiently high to enhance the range of said torque in which traction is maintained.

2. The method as recited in claim 1 wherein the sonic energy is applied directly to the wheels of said vehicle.

3. The method as recited in claim 1 wherein the sonic energy is applied to a wheel axle of said vehicle.

4. The method as recited in claim 2 wherein said sonic energy is applied directly to said wheels so as to cause sinusoidal elastic resonant vibration of said wheels.

5. The method as recited in claim 3 wherein the sonic energy is applied to said axle so as to cause resonant elastic vibration of said axle and the wheels mounted thereon.

6. The method as recited in claim 1 wherein the vibrational energy is selectively coupled to said wheels only at times when increased traction is called for.

7. In a vehicle having wheels which ride on a rail, means for improving the traction between at least one of said wheels and the rail comprising
sonic elastic vibration oscillator means mounted on said vehicle for generating sonic vibrational energy,
means driving said oscillator means,
sonic energy transmission means coupling the elastic vibrational energy output of said oscillator means to said one of said wheels of said vehicle to cause high sonic action at the interface between said one of said wheels and the rail, and
means applying torque force to said wheel while said wheel is maintained with high contact pressure against said rail, said oscillator driving means being operable while said torque force is applied to said wheel.

8. The device as recited in claim 7 and additionally including means for selectively controlling the driving of said oscillator means.

9. The device as recited in claim 7 wherein said sonic oscillator means comprises an orbiting mass oscillator.

10. In a vehicle having wheels which ride on a rail, means for improving the traction between at least one of said wheels and the rail comprising
sonic elastic vibration oscillator means mounted on said vehicle for generating sonic vibrational energy,
means driving said oscillator means,
sonic energy transmission means coupling the elastic vibrational energy output of said oscillator means to said one of said wheels of said vehicle to cause high sonic action at the interface between said one of said wheels and the rail, said coupling means including an axle on which said wheels are mounted, said oscillator means being mounted on said axle to vibrationally excite said axle, and
means applying torque force to said wheel while said wheel is maintained with high contact pressure against said rail, said oscillator driving means being operable while said torque force is applied to said wheel.

11. The device as recited in claim 10 wherein said oscillator means has a vibrational output at such a frequency so as to cause longitudinal resonant vibration of said axle.

12. In a vehicle having wheels which ride on a rail, means for improving the traction between at least one of said wheels and the rail comprising
sonic elastic vibration oscillator means comprising an orbiting mass oscillator mounted on the wheels of said vehicle to cause lateral elastic vibration thereof,
means driving said oscillator means,
sonic energy transmission means coupling the elastic vibrational energy output of said oscillator means to said one of said wheels of said vehicle to cause high sonic action at the interface between said one of said wheels and the rail, and
means applying torque force to said wheel while said wheel is maintained with high contact pressure against said rail, said oscillator driving means being operable while said torque force is applied to said wheel.

13. In a vehicle having wheels which ride on a rail, means for improving the traction between at least one of said wheels and the rail comprising
sonic elastic vibration oscillator means including a plurality of orbiting mass oscillators mounted around the rim of said one of said wheels of said vehicle for generating sonic vibrational energy, said oscillators being mounted and having an output frequency such as to cause lateral elastic resonant vibration of said one of said wheels,
means driving said oscillator means,
sonic energy transmission means coupling the elastic vibrational energy output of said oscillator means to said one of said wheels of said vehicle to cause high sonic action at the interface between said one of said wheels and the rail, and
means applying torque force to said wheel while said wheel is maintained with high contact pressure against said rail, said oscillator driving means being operable while said torque force is applied to said wheel.

14. The device as recited in claim 13 wherein said oscillator means includes four orbiting mass oscillators arranged in quadrature relationship around said rim.

15. In a vehicle having wheels which ride on a rail, means for improving the traction between at least one of said wheels and the rail comprising
sonic elastic vibration oscillator means comprising an orbiting mass oscillator adapted to be driven by a fluid and mounted on said vehicle for generating sonic vibrational energy, means driving said oscillator means comprising a source of fluid, means mounted on said vehicle for containing said fluid, and means for selectively feeding said fluid to said oscillator, sonic energy transmission means coupling the elastic vibrational energy output of said oscillator means to said one of said wheels of said vehicle to cause high sonic action at the interface between said one of said wheels and the rail, and means applying torque force to said wheel while said wheel is maintained with high contact pressure against said rail, said oscillator driving means being operable while said torque force is applied to said wheel.

16. The device as recited in claim 15 wherein said means for selectively feeding said fluid to said oscillator comprises a feed line running from said containing means to said oscillator and manually operable valve means interposed in said feed line.

17. The device as recited in claim 16 wherein said fluid is compressed air.

18. The device as recited in claim 16 wherein said fluid is steam.

19. In a railroad locomotive having wheel axles, means for rotatably mounting said axles and wheels fixedly attached to said axles which ride on a rail, means for improving the traction between at least one of said wheels and the rail comprising sonic elastic vibration oscillator means comprising an orbiting mass oscillator adapted to be driven by a fluid and mounted on one of the axles of said vehicle for generating sonic vibrational energy, means driving said oscillator means comprising a source of fluid, means mounted on said vehicle for containing said fluid and means for selectively feeding said fluid to said oscillator, said one of said axles coupling the elastic vibrational energy output of said oscillator means to said one of said wheels of said vehicle to cause high sonic action at the interface between said one of said wheels and the rail, and means applying torque force to said wheel while said wheel is maintained with high contact pressure against said rail, said oscillator driving means being operable while said torque force is applied to said wheel.

References Cited

UNITED STATES PATENTS

| | | | |
|---|---|---|---|
| 1,386,029 | 8/1921 | Rossiter | 33—226 |
| 1,518,762 | 12/1924 | Tanner | 33—226 |
| 2,321,059 | 6/1943 | Anderson | 105—48 XR |
| 2,746,813 | 5/1956 | Massa | 308—1 |
| 2,838,009 | 6/1958 | Bonanno | 105—77 |
| 3,018,142 | 1/1962 | Warnock | 308—9 |
| 3,024,357 | 3/1962 | Hammond | 246—125 XR |
| 3,171,696 | 3/1965 | Houghton | 308—1 |
| 3,175,634 | 3/1965 | Bateson | 301—41 XR |
| 3,239,283 | 3/1966 | Broeze et al. | 308—9 |
| 3,339,421 | 9/1967 | Warnock | 74—5 |

ARTHUR L. LA POINT, Primary Examiner

HOWARD BELTRAN, Assistant Examiner

U.S. Cl. X.R.

33—226; 74—5; 105—76; 246—182; 291—1, 2, 3; 295—1, 36; 301—41; 308—1, 9